Dec. 5, 1939.  H. POLECK  2,182,641
TILTING RELAY DEPENDING ON THE RATIO BETWEEN CURRENT
AND VOLTAGE AND THE PHASE DISPLACEMENT
Filed July 1, 1937
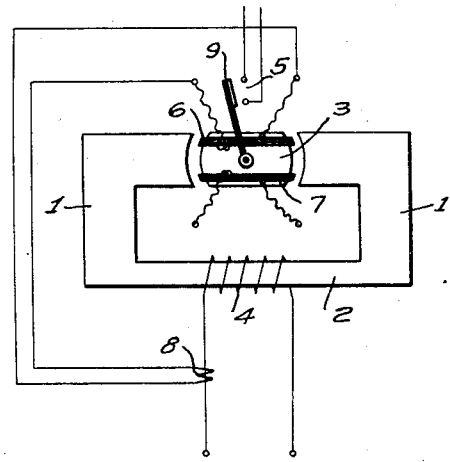
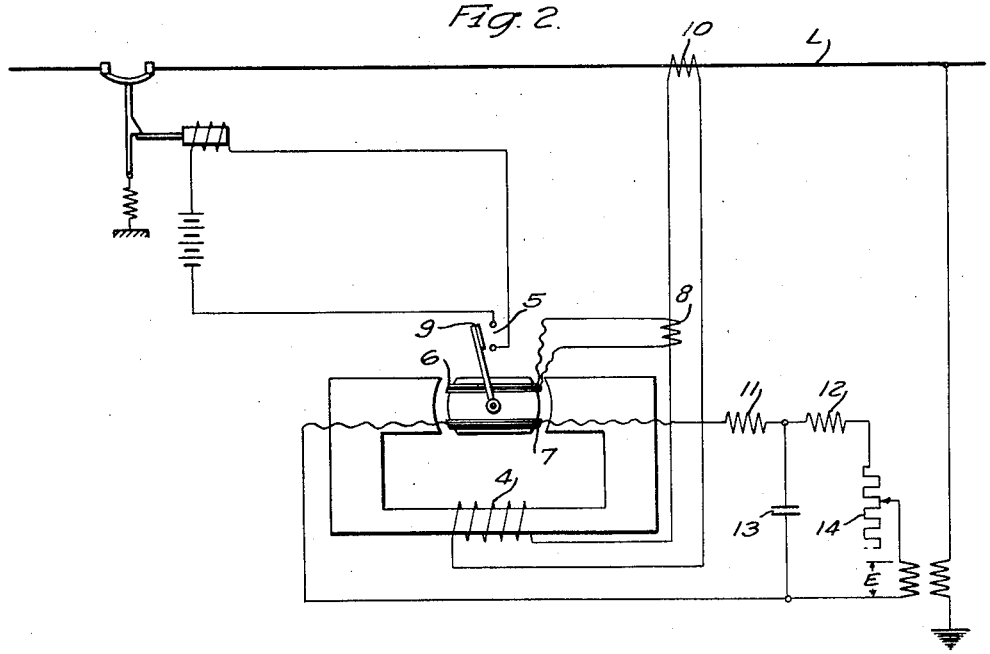
WITNESSES:
INVENTOR
Hans Poleck.
BY
ATTORNEY Patented Dec. 5, 1939

2,182,641

UNITED STATES PATENT OFFICE 2,182,641

TILTING RELAY DEPENDING ON THE RATIO BETWEEN CURRENT AND VOLTAGE AND THE PHASE DISPLACEMENT

Hans Poleck, Berlin-Siemensstadt, Germany, assignor to Siemens & Halske, Aktiengesellschaft, Siemensstadt, near Berlin, Germany, a corporation of Germany Application July 1, 1937, Serial No. 151,551
In Germany June 9, 1936

7 Claims. (Cl. 175—294)

The invention relates to a tilting relay which responds if the ratio between a current and a voltage falls below a certain value. In this case, however, the phase angle between current and voltage is to exert an influence insofar, for instance, that the relay is influenced by a certain component of such ratio, for instance, the reactance, the effective resistance or a differently selected resistance component.

According to this invention, a relay is provided with a stationary magnetic system and a movable system. The stationary system is excited in accordance with the current traversing a circuit from which the relay is to be energized, and the movable system is provided with two coils respectively excited in accordance with the voltage and the current of the circuit. If the phase angle between the voltage and current fields in the relay corresponds with the phase angle of the circuit, the relay response will be dependent on the effective resistance of the circuit; but if the phase angle of the relay voltage field with respect to the current field is varied 90° by a phase adjuster, the relay response will be dependent on the reactance of the circuit. The relay response may be made dependent on either the inductive reactance or the capacitive reactance of the circuit by proper selection of the direction in which the phase angle is varied, or by proper selection of the direction of movement of the relay during which the relay contacts are closed. Since the stationary magnet system is excited only by the current, and the current field of the stationary magnet system provides a common field for the two coils of the moving system, the absolute intensity of this current field is not critical. The two coils of the movable system rotate as a unit with respect to the stationary system and are energized in such a way that they produce opposed turning moments. Both turning moments depend to the same extent on the intensity of the common current field. This may be utilised according to the invention by so dimensioning the stationary magnet system that saturation will take place even with low intensity of the current. It will be possible to in this way obtain a favourable limitation of the maximum torque of the relay. A further consequence of this will be, that the mechanical stress of the contact arm and the contacts will be less, that rebounding will be easier to avoid and, principally, that the damping for steadying the moving system may be kept considerably smaller. When applying the relay in connections with alternating current of 50 cycles or with alternating current of even higher frequency the pulsation of the torque may be rendered harmless by relatively simple means. In the case of a considerably lower number of cycles, for instance with the frequency of 16⅔ cycles usually found in railway equipments, the pulsations of the torque will in fact be so slow, that it will be extremely difficult, owing to the inertia of the system and its damping, to obtain sufficient steadying of the system. In this respect the limitation of the maximum torque by saturation of the stationary magnet according to the invention embodies an essential improvement. Limiting the maximum torque will therefore render the relay excellently suitable for low frequency alternating current, as for instance in railway equipments or in plants with a still lower number of cycles. It is known in the case of a relay with a stationary magnet system and a moving coil to excite the moving coil by the voltage and to excite the stationary magnet system by the current and the voltage. But such arrangement has fundamental disadvantages as compared with an arrangement according to the invention. Such system does not supervise the resistance of the line or a resistance component of the line, and also not a component of the conductivity of the line. Besides, the strong magnetic coupling between the current and voltage windings of the stationary magnet system tends to make the relay become inaccurate. In addition, reduction of the current field for the purpose of keeping the maximum torque small will be impossible, since the current field and the voltage field traverse the same magnet circuit.

For illustrating the invention two figures are submitted, of which, Figure 1, represents the fundamental construction of the relay and Figure 2 the connection of its coils.

In Figure 1 the stationary magnet system is denoted by 1 and 2, the moving magnet system by 3. Part 2 has a reduced iron cross section. The moving magnet system 3 is arranged in the air gap of the stationary magnet system 1, 2. Connected with the axis of the moving system 3 is a contact arm 9 which closes a pair of contacts 5 when the relay is actuated.

The stationary magnet system 1, 2 has only one exciting coil 4 traversed by the current. The moving system 3, however, has two coils, namely, a coil 6, which is also excited by the current, and a coil 7, which is excited by the voltage of the circuit to be supervised. The exciting circuit for the voltage coil is not shown in detail in Figure 1. The exciting circuit for the current coil 6 is fed from an intermediate transformer 8, which at the primary side is traversed by the same current as the winding 4. In consequence thereof the excitation of the moving current coil 6 is proportional to the current of the part of the circuit being supervised, and the voltage at the voltage coil 7 is proportional to the voltage of the part of the circuit being supervised. Owing to the smalless of the iron cross section of the stationary magnet system in part 2 and the selection of the windings of the coil 4, the effects of magnetic saturation will show in the stationary magnet system in that the magnetic field caused by the current in the coil 4 increases less than linearly with respect to the exciting current in the coil 4. For example, the magnetic system may be so proportioned that for a current range of 1:60 the magnetic flux will rise in the stationary magnet system only at about the ratio of 1:5 to 1:3. The advantages resulting from the limitation of the maximum torque of the moving system obtained in this manner have already been pointed out in the foregoing.

Figure 2 discloses the connection of the exciting coils of the relay, if the reactance of a part of the circuit is to be supervised by the relay. The respective coils are denoted in Figure 2 with the same reference characters as in Figure 1. Coil 4 of the stationary magnet system is excited by means of a current transformer 10 by the current of the line L. The current of the coil is therefore proportional to the line current L and has the same phase angle. The coil 6 of the moving system is excited by means of an intermediate transformer 8 by a current also proportional to the current of the line L, corresponding to the same phase angle as the current in the coil 4. The voltage coil 7 is excited by the line voltage E. In the case of a reactance relay, assumed in Figure 2, a phase displacement of 90° is caused by an artificial connection. Figure 2 shows an example of such artificial connection, consisting of two inductances 11 and 12 and a capacity 13. If the reactances of the inductances 11 and 12 and of the capacity 13 have the same valve at the frequency of the voltage E, such artificial connection will permit of adapting the system, with the aid of a simple adjustable resistance 14, to any desired voltage or, respectively, to the limiting resistance adjustment of the relay.

Artificial connection 11, 12, 13 is not required if the effective resistance and not the reactance is to be supervised. There may be employed also any other value of phase displacement between 0 and 90° for supervising another angle component of the impedance of the part of the circuit to be supervised. In a case of this kind the combination 11, 12, 13 is replaced by another corresponding artificial connection.

An arrangement according to the invention may be employed for line protection purposes, or for the protection of other parts of a circuit, where the ratio between voltage and current in the case of faults falls below a predetermined limit. This will occur, for instance, with a fault in a machine, or also in a bus bar arrangement, whereby for the excitation of the relay the currents of various lines (feed lines, consumers' lines) must be combined. Another field of application of the relay is the covering of grounds in supply networks or machines. In this case the total current and the fault voltage are used for excitation.

What I claim is:

1. In a relay responsive to the condition of a circuit, magnetizing means controlled by the current flowing in said circuit for establishing a magnetic flux field, said magnetizing means being proportioned to increase said magnetic field at a rate less than the rate of increase of said current, contact making means, a pair of coils in said field and movable with respect to said field for actuating said contact making means, and energizing means for energizing one of said coils in accordance with the voltage of said circuit and the other of said coils in accordance with the current flowing in said circuit.

2. In a relay responsive to the condition of a circuit, magnetizing means controlled by the current flowing in said circuit for establishing a magnetic flux field, said magnetizing means being proportioned to increase said magnetic field at a rate less than the rate of increase of said current, contact making means, a pair of substantially parallel coils in said field and movable with respect to said field for actuating said contact making means, and energizing means for energizing one of said coils in accordance with the voltage of said circuit and the other of said coils in accordance with the current flowing in said circuit.

3. In a relay responsive to the condition of a circuit, a magnetic member for defining a magnetic flux field, contact making means, a pair of substantially parallel coils in said field and rotatable with respect to said magnetic member for actuating said contact making means, and energizing means for energizing one of said coils in accordance with the voltage of said circuit and the other of said coils in accordance with the current flowing in said circuit.

4. In a relay responsive to the condition of a circuit, a magnetic member for defining a magnetic flux field, magnetizing means for magnetizing said magnetic member in accordance with an energy component of said circuit, said magnetic member being designed to saturate at a value of said energy component within the operating range of said relay, contact making means, a pair of coils in said field and movable with respect to said magnetic member for actuating said contact making means, and energizing means for energizing one of said coils in accordance with the voltage of said circuit and the other of said coils in accordance with the current flowing in said circuit.

5. In a relay responsive to the condition of a circuit, a magnetic member for defining a magnetic flux field, magnetizing means for magnetizing said magnetic member in accordance with the current flowing in said circuit, said magnetic member having a saturation characteristic such that the magnetic flux therein increases less than linearly with respect to said current, contact making means, a pair of coils in said field and movable with respect to said magnetic member for actuating said contact making means, and energizing means for energizing one of said coils in accordance with the voltage of said circuit and the other of said coils in accordance with the current flowing in said circuit.

6. In a relay responsive to the condition of a circuit, a magnetic member having a pair of pole faces for producing a magnetic field, contact making means, a pair of substantially parallel coils in said field and rotatable with respect to said magnetic member for actuating said contact making means, and energizing means for energizing one of said coils in accordance with the value of the voltage of said circuit, for energizing the other of said coils in accordance with the value of the current flowing in said circuit and for exciting said magnetic member in accordance with one of said values, said magnetic member having a saturation characteristic such that it saturates within the range of energization thereof.

7. In a relay responsive to the condition of an alternating current circuit, a magnetic member for defining a magnetic flux field, contact making means, a pair of substantially parallel coils in said field and rotatable with respect to said magnetic member for actuating said contact making means, and energizing means for energizing a first one of said coils in accordance with the voltage of said circuit and the other of said coils in accordance with the current flowing in said circuit, said energizing means including means for displacing the phase of energizing current for said first one of said coils relative to said voltage.

HANS POLECK.